United States Patent Office 3,162,646
Patented Dec. 22, 1964

3,162,646
SPIROHYDANTOIN DERIVATIVE
Martin A. Davis and Ferenc Herr, Montreal, Quebec, Canada, assignors to American Home Products Corporation, New York, N.Y., a corporation of Delaware
No Drawing. Filed Jan. 8, 1963, Ser. No. 250,004
1 Claim. (Cl. 260—309.5)

This invention relates to a novel chemical compound and its water-soluble alkali metal salts having pronounced biological actions.

The novel chemical compound is a spirohydantoin formed from the linkage of a hydantoin ring with a dibenzo[a,d][1,4]cycloöctadiene ring, the linkage being such that a spiro ring system is formed.

The compound, spiro{imidazolidine - 4,5'-dibenzo[a,d][1,4]cycloöctadiene}-2,5-dione has surprising biological actions. It causes marked excitation and behavioral changes; it increases alertness and excitability and possesses other actions typical of central nervous system stimulants, these actions being elicited at doses below those causing toxic manifestations. This finding is in contrast to that for similar hydantoins in general and for the immediate lower homologue, in particular. This latter compound, known as spiro{imidazolidine - 4,5' - dibenzo[a,d][1,4]cycloheptadiene} - 2,5 - dione is a central depressant and has anticonvulsant action.

The spirohydantoin of this invention may be prepared by the condensation of dibenzo[a,d][1,4]cycloöctadiene-5-one with ammonium carbonate and an alkali metal cyanide in a suitable solvent at an elevated temperature. In a preferred process one may use as the alkali metal cyanide, potassium cyanide and as solvent fused acetamide, operating at a temperature range of from 140° C. to 170° C. for a period of time in the order of 84 hours. These general conditions for the formation of diaryl hydantoins from diaryl ketones have been disclosed by H. R. Henze in U.S. Patent 2,409,754 (1946). The preparation of the ketone used herein, viz. dibenzo[a,d][1,4]cycloöctadiene-5-one, has been disclosed in a copending U.S. Patent Application of S. O. Winthrop and M. A. Davis, S.N. 137,987, filed September 14, 1961 (AHP–2566).

The product may be isolated by dilution of the reaction mixture with water, addition of a little sodium hydroxide and removal by filtration of the unchanged ketone. Acidification of the solution, which contains the sodium salt of the product, liberates the hydantoin which may be purified by sublimation in vacuo and by recrystallization from an appropriate solvent.

The following reaction scheme and descriptive example will illustrate our invention.

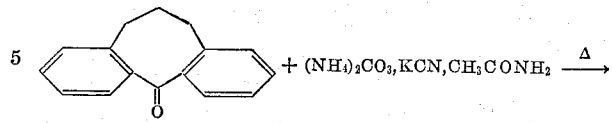

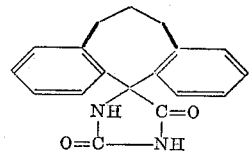

*Example*

Acetamide (100 g.) was melted on the steam bath and dibenzo[a,d][1,4]cycloöctadiene - 5 - one (13.8 g., 0.062 mole) was added. This was followed by potassium cyanide (5.6 g., 0.086 mole) which was stirred into the mixture and then ammonium carbonate (25 g.). The vessel was placed in an autoclave which was sealed as rapidly as possible and then heated at 140° C. for 84 hours. The mixture was cooled and stirred with water (300 ml.) containing a little sodium hydroxide. The insoluble portion was filtered off to give 12.2 g. of unchanged ketone. Acidification of the solution with hydrochloric acid gave a precipitate (1.5 g.) which was sublimed at 260–280° C. at about 0.1 mm. pressure. After removal of a small quantity of volatile material there was obtained the desired spiro{imidazolidine - 4,5' - dibenzo[a,d][1,4]cyclo-öctadiene}-2,5-dione as a solid with M.P. over 360° C. It could be optionally purified by recrystallization from ethanol.

Analysis confirmed the empiric formula $C_{18}H_{16}N_2O_2$. Required: C, 74.00%; H, 5.52%; N, 9.59%. Found: C, 74.06%; H, 5.57%; N, 9.88, 9.89%.

We claim:
Spiro{imidazolidine - 4,5' - dibenzo[a,d][1,4]cycloöctadiene}-2,5-dione.

References Cited in the file of this patent

UNITED STATES PATENTS 2,409,754    Henze _____ Oct. 22, 1946

FOREIGN PATENTS 807,678    Great Britain _____ Jan. 21, 1959
807,679    Great Britain _____ Jan. 21, 1959

OTHER REFERENCES

Henze et al.: Jour. Organic Chem., vol. 15, pp. 901–7 (1950). Ware Chemical Reviews, vol. 46, pp. 422–5 (1950).